R. A. TRACE.
VALVE FOR CAKE FORMING PRESSES.
APPLICATION FILED APR. 25, 1921.

1,428,998.

Patented Sept. 12, 1922.
3 SHEETS—SHEET 1.

INVENTOR.
Russell A. Trace
BY
Toulmin & Toulmin
ATTORNEYS.

R. A. TRACE.
VALVE FOR CAKE FORMING PRESSES.
APPLICATION FILED APR. 25, 1921.

1,428,998.

Patented Sept. 12, 1922.
3 SHEETS—SHEET 2.

INVENTOR
Russell A. Trace
BY
Toulmin & Toulmin
ATTORNEY

R. A. TRACE.
VALVE FOR CAKE FORMING PRESSES.
APPLICATION FILED APR. 25, 1921.
1,428,998.
Patented Sept. 12, 1922.
3 SHEETS—SHEET 3
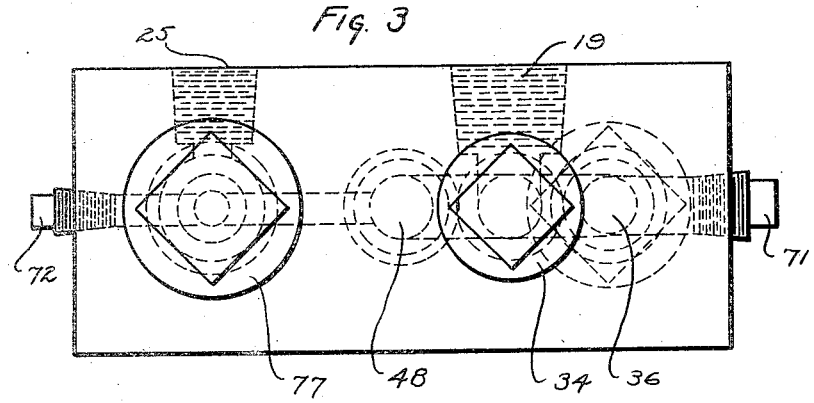
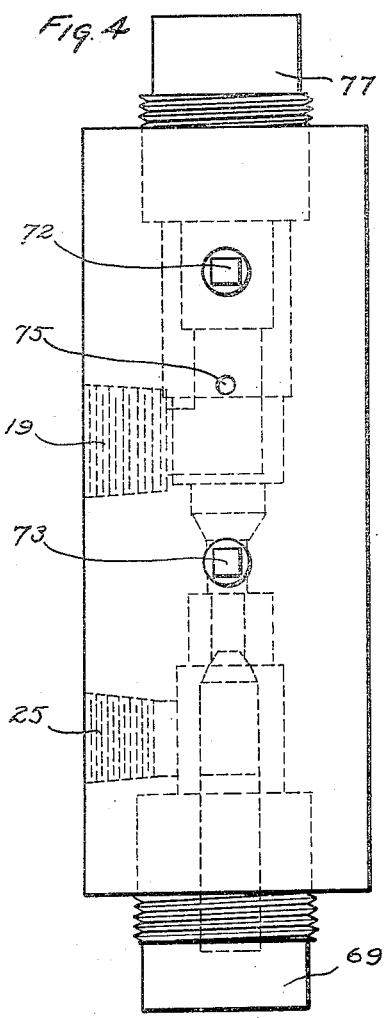
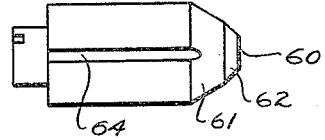
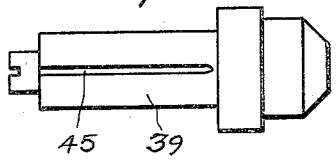
INVENTOR
Russell A. Trace
BY
Toulmin & Toulmin
ATTORNEY Patented Sept. 12, 1922.

1,428,998

UNITED STATES PATENT OFFICE.

RUSSELL A. TRACE, OF DAYTON, OHIO, ASSIGNOR TO BUCKEYE IRON & BRASS WORKS, OF DAYTON, OHIO, A CORPORATION OF OHIO.

VALVE FOR CAKE-FORMING PRESSES.

Application filed April 25, 1921. Serial No. 464,230.

*To all whom it may concern:*

Be it known that I, RUSSELL A. TRACE, a citizen of the United States, residing at Dayton, in the county of Montgomery and State of Ohio, have invented certain new and useful Improvements in Valves for Cake-Forming Presses, of which the following is a specification, reference being had therein to the accompanying drawing.

My invention relates to formers and in particular to cake forming presses for forming into cakes oil bearing material.

The object of my invention is to provide a press which will utilize a low pressure for the major portion of its operations and for the final step in pressing will utilize very high pressure. It is an object of my invention to provide a former which will not automatically bring into play the high pressure when the initial load momentarily throws a greater load upon the operating mechanism than it customarily carries during the low pressure period.

It is a further object of my invention to provide means for relieving any back pressure due to confined air or liquid behind the main operating piston which converts the supply from the low pressure to high pressure.

It is a further object of my invention to prevent any back pressure from the high pressure line into the low pressure line when the high pressure is brought into play. It is my object to provide a valve mechanism which may be readily cleaned without being completely taken apart and which may be adjusted in any particular part without disturbing the remainder of the mechanism.

Referring to the drawings:

Fig. 3, is a top plan view of the valve mechanism;

Fig. 4, is an end view of the valve mechanism looking at it from the left hand side of Figure 2;

Fig. 5, is a bottom view of the high pressure valve member;

Fig. 6, is a side elevation of the high pressure valve member;

Fig. 7, is a side elevation of the low pressure line sealing member.

Figure 1:
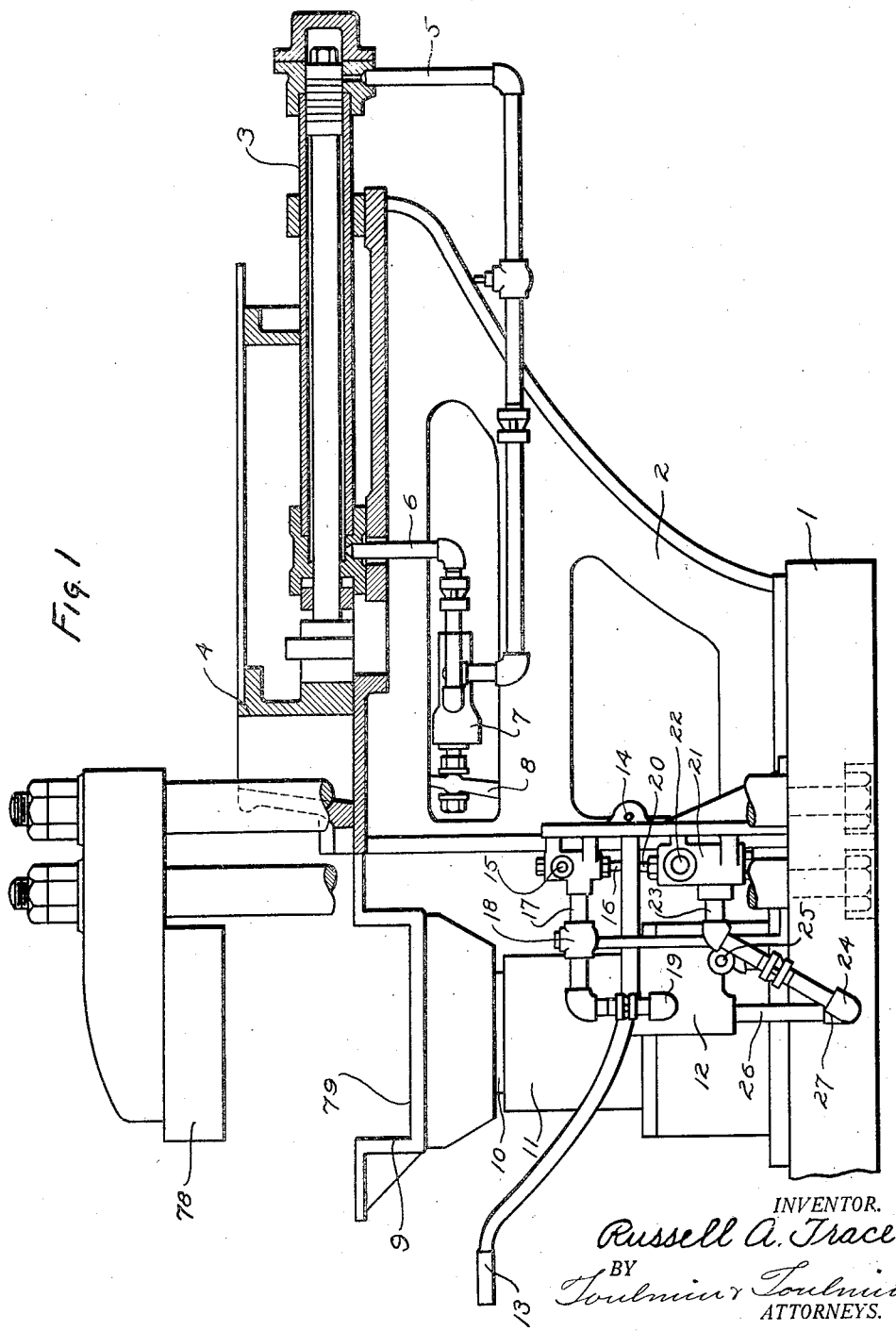
Fig. 1, is a side elevation of my improved former.

In detail the drawings show the following: 1 is a base upon which the former rests, having a supporting casting 2 supporting the charging cylinder 3 and the charging box 4. This charging cylinder is supplied with fluid through the pipe 5 to move the charging hopper 4 in the left hand direction and is supplied with fluid through the pipe 6 to move the piston in the cylinder 3 and the charging hopper 4 to the right hand. 7 is the valve controlling the delivery of liquid to the cylinder 3, and 8 is the lever that controls the valve.

In the present invention this is of no particular moment and is merely described in order to provide a complete disclosure of machinery of this character.

9 is a forming box of the usual character that is mounted upon a piston 10 in the cylinder 11 to which fluid from the valve casing 12 is delivered in any well known manner in presses of this character. 13 is the operating handle pivoted at 14 to the frame of the mechanism. 15 is the low pressure inlet pipe in which is a valve member 16 that is adapted to be lifted to admit low pressure fluid when the lever 13 is lifted. The pipe 17 conveys the low pressure fluid past the check valve 18 into the casing 12 at 19. 20 is the exit valve which, when depressed by the lever 13, opens up the valve 21 and permits the fluid to make its exit through the pipe 23 from the opening just behind the pipe at 24 to the outside through the pipe 22. 25 is the high pressure line which communicates with the valve casing 12 to deliver high pressure fluid to the valve mechanism and to the press automatically. Both high pressure and low pressure fluid are delivered from the valve casing to the pipe 26 to the base of the press at 27.

Figure 2:
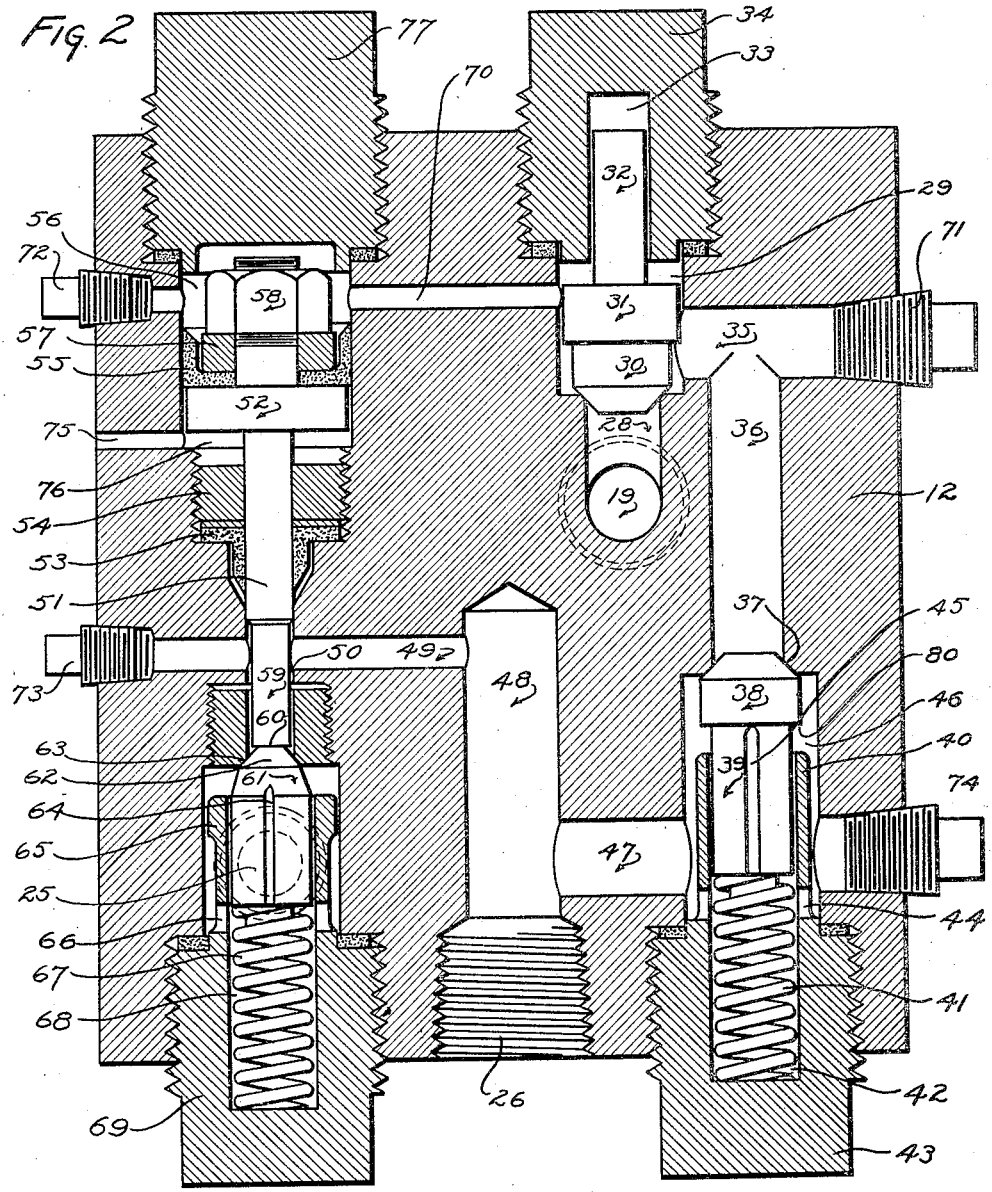
Fig. 2, is a section of the valve mechanism.

Referring to Figure 2, in the casing 12 communicating with the inlet low pressure port 19 is a passage way 28 that communicates with a valve chamber 29 in which there moves a valve member 30 having an enlarged portion 31 and a stem 32. The stem travels in a cylindrical cutaway area 33 in a plug 34 which constitutes one end of the chamber 29. This chamber 29 communicates with a passage way 35 which in turn communicates with a passage way 36. 36 has at one end thereof a shoulder 37 against which seats the head 38 of a valve member 39. This valve member 39 is guided in a collar 40 in which it fits loosely. 38 is normally maintained in engagement with 37 by the coil spring 41 seated in the cylindrical aperture 42 of the plug 43. 40 is equipped with a number of apertures 44 for a purpose hereinafter described. 45 are cutaway portions or grooves in 39 for the passage of fluid for a purpose to be described. The passage way 36 communicates with this valve chamber 46 that in turn communicates with the passage way 47. 47 communicates with the main exit passage way 48 and the exit pipe 26. 48 communicates with the high pressure outlet passage way 49 which in turn communicates with the outlet passage way 50 in which travels the stem 51 of the piston 52. The rod 51 travels through a washer 53 and a bushing or plug 54. It has a ring or washer 55 engaging with the walls of the cylindrical chamber 56 in which it travels. This washer is maintained on 52 by the washer 57 and nut 58 threaded on one end of rod 51. 51 at 59 has a portion of its length decreased in diameter. One end of 59 rests against the end 60 of the high pressure valve 61. The shoulder 62 of this high pressure valve is seated against a corresponding shoulder 63 in the casing adjacent the end of the passage way 50. This high pressure valve 61 has a plurality of cutaway portions or grooves 64. It is loosely guided by the casing 65 that has a plurality of apertures 66 in the base thereof. The valve member 61 is held against its seat by a helical spring 67, which is located in a cylindrical aperture 68 of the plug 69.

The chamber 56 communicates with the chamber 29 by a passage way 70.

The plugs 71, 72, 73 and 74 are not essential to the construction, but are merely placed in the block 12 to seal the openings communicating with the exterior of the various passage ways which are formed by the drills utilized in manufacturing this valve block 12. The block may be cast or formed in any suitable way.

75 is a passage way communicating with the cylindrical area 76 behind 52 to permit of the exit of any confined air or liquids and thus readily permit of the movement of 52 without being retarded by such confined gases or liquids. 77 is a plug which when removed permits of the removal of 52 and its accompanying parts or the adjustment of those parts.

*Method of operation.*

Low pressure fluid of 450 to 500 pounds is admitted through 19. When the press is initially started a back pressure will be set up of greater than 450 to 500 pounds due to the inertia of the various parts of the press. The forming box and its accompanying parts are quite heavy and this back pressure due to the initial movement of them amounts to considerable pressure. In some instances it has been found that such back pressure will have the effect to trip the valve 62 as hereinafter explained and admit the high pressure prematurely.

To avoid this possibility I have provided the valve 30 around which the oil or fluid of the low pressure type must pass on its way through 35 to 36 with a shoulder 31 that substantially seals the passage way 70 during the initial stages of the admission of oil and the parts are being initially moved. This prevents any rush of oil into the passage way 70 and into the cylindrical area 56 behind 52 which might operate it. As soon as the first movement of the pressing box has taken place this danger is obviated and the oil can flow in behind 52 at 56 through 70 and be maintained at its constant pressure of 450 to 500 pounds. The low pressure oil will also pass through 35 having lifted 30 to its uppermost position. It will then pass through 36, depress 38 and 39, pass into 46 to 47, 48 and out 26 to the press.

The press is moved upwardly to meet the pressing head 78 with the meal to be formed at 79 until the resistance to further compression of the meal becomes such that the back pressure exceeds 500 pounds or some predetermined pressure. When this predetermined pressure has been reached the back pressure through 26, 48, 47, 46, 36, 35, 29, 70 and in 56 behind 52 is great enough on the area exposed in 56 of 52 to overcome the high pressure upon the valve member 61, then 52 will move downwardly because of the differential areas of 52 and 61 and the differences in relative pressures thereon moving 61 to an open position off of its seat 63 and admitting high pressure of from 4,000 to 5,000 pounds through the inlet port 25, 50, 49, to 48, and thence through 26 to the press for the final forming operation. This high pressure also serves to seat 38 on 37 as the high pressure oil accumulates behind 39 and passes through the apertures 44 and up through the passage ways 45 against the shoulder 80 of 38. This prevents the back pressure from going in the low pressure line at 36, etc. The oil in 36, 35, 29 being in a state of equilibrium the valve member 30 seats itself due to the effect of gravity.

In order to prevent any hindrance to 52 moving promptly downwardly when the pressure becomes sufficient to effect that movement, I have provided an opening 75 to allow the exit of any confined air or liquids which may be between 52 and the bottom of the cylindrical passage way 56 in which it travels. I have found this a very effective means for insuring positive operation of this mechanism.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In a former, an inlet valve, an outlet valve, means for actuating said valves, means for cutting off a low pressure supply at a predetermined point, means for preventing back pressure from prematurely cutting off the low pressure supply, and means for applying high pressure to the former head.

2. In a former, an inlet valve, an outlet valve, means for actuating said valves, means for cutting off a low pressure supply at a predetermined point, means for preventing back pressure from prematurely cutting off the low pressure supply, means for applying high pressure to the former head, and means to prevent said last mentioned means from failing to operate due to back pressures of liquids or gases adjacent thereto.

3. In a former, a low pressure inlet valve, an outlet valve, means for successively actuating said valves at will, an inlet high pressure valve, means for cutting off a low pressure supply at a predetermined pressure, means for preventing said low pressure supply from being cut off prematurely by back pressure in the initial stages of the operation, and means for applying a high pressure to the forming head after the low pressure has been applied and cut off.

4. In a former, a low pressure inlet valve, an outlet valve, means for successively actuating said valves at will, an inlet high pressure valve, means for cutting off a low pressure supply at a predetermined pressure, means for preventing said low pressure supply from being cut off prematurely by back pressure in the initial stages of the operation, means for applying a high pressure to the forming head after the low pressure has been applied and cut off, and means for preventing the high pressure applying means from failing to function due to obstructing gases and liquids.

5. In a former, means for applying low pressure, means for preventing back pressure from the former in the initial stages of the operation from applying high pressure prematurely, means to apply high pressure at a predetermined pressure due to the back pressure from the former, means actuated by the high pressure to cut off the low pressure supply and to prevent the backing of the high pressure into the low pressure line, whereby low pressure is applied during a portion of the operation and high pressure during the remainder of the operation.

6. In combination, in a valve casing, a low pressure inlet, low pressure passage ways communicating with a main exit passage way; a main exit passage way; means in the inlet low pressure passage way for partially sealing an exit passage way to a pressure converting valve mechanism to prevent premature operation thereof by initial back pressure from the former; a back pressure operated converting valve mechanism communicating with the low pressure line to be operated by back pressure therein, a high pressure valve mechanism adjacent thereto and adapted to be operated thereby, a high pressure inlet passage way communicating with said high pressure valve and means communicating with the main exit passage way, whereby when the back pressure in the exit line achieves a predetermined pressure it will operate the converting valve mechanism and admit high pressure to the former.

7. In combination, in a valve casing, a low pressure inlet, low pressure passage ways communicating with a main exit passage way; a main exit passage way; means in the inlet low pressure passage way for partially sealing an exit passage way to a pressure converting valve mechanism to prevent premature operation thereof by initial back pressure from the former; a back pressure operated converting valve mechanism communicating with the low pressure line to be operated by back pressure therein, a high pressure valve mechanism adjacent thereto and adapted to be operated thereby, a high pressure inlet passage way communicating with said high pressure valve and means communicating with the main exit passage way, and means operated by the high pressure for sealing the low pressure line to prevent the entrance thereto of high pressure after said converting valve mechanism has operated, whereby when the back pressure in the exit line achieves a predetermined pressure it will operate the converting valve mechanism and admit high pressure to the former.

8. In combination, in a valve casing, a low pressure inlet, low pressure passage ways communicating with a main exit passage way; a main exit passage way; means in the inlet low pressure passage way for partially sealing an exit passage way to a pressure converting valve mechanism to prevent premature operation thereof by initial back pressure from the former; a back pressure operated converting valve mechanism communicating with the low pressure line to be operated by back pressure therein, a high pressure valve mechanism adjacent thereto and adapted to be operated thereby, a high pressure inlet passage way communicating with said high pressure valve and means communicating with the main exit passage way, whereby when the back pressure in the exit line achieves a predetermined pressure it will operate the converting valve mechanism and admit high pressure to the former, and means behind the converting valve mechanism to permit of the exit of confined gases and liquids adjacent thereto.

9. In combination, in a valve casing, a low pressure inlet, low pressure passage ways communicating with a main exit passage way; a main exit passage way; means in the inlet low pressure passage way for partially sealing an exit passage way to a pressure converting valve mechanism to prevent premature operation thereof by initial back pressure from the former; a back pressure operated converting valve mechanism communicating with the low pressure line to be operated by back pressure therein, a high pressure valve mechanism adjacent thereto and adapted to be operated thereby, a high pressure inlet passage way communicating with said high pressure valve, means communicating with the main exit passage way, whereby when the back pressure in the exit line achieves a predetermined pressure it will operate the converting valve mechanism and admit high pressure to the former, means behind the converting valve mechanism to permit of the exit of confined gases and liquids adjacent thereto, and means for sealing the low pressure line to prevent the entrance thereto of high pressure after the conversion from low pressure to high pressure has taken place.

10. In combination, a valve casing, an inlet passage way communicating with an inlet valve chamber, an inlet valve therein adapted to seal said inlet valve passage way and having a shoulder thereon to partially seal an exit passage way from said chamber communicating with a chamber behind a high pressure valve operating mechanism, and an exit passage way from said first mentioned chamber communicating with a former, whereby back pressure from the former is prevented from communicating with the second chamber until the former has been initially moved.

11. In combination, a valve casing, an inlet passage way communicating with an inlet valve chamber, an inlet valve therein adapted to seal said inlet valve passage way and having a shoulder thereon to partially seal an exit passage way from said chamber communicating with a chamber behind a high pressure valve operating mechanism, an exit passage way from said first mentioned chamber communicating with a former, whereby back pressure from the former is prevented from communicating with the second chamber until the former has been initially moved, a high pressure valve, a high pressure chamber communicating with a high pressure inlet passage way, a high pressure inlet passage way, said chamber communicating with the exit passage way to the former, and means connected to said valve operating mechanism for unseating said high pressure valve member when the back pressure on said valve operating mechanism in the second mentioned chamber shall have reached a predetermined point.

12. In combination, a valve casing, an inlet passage way communicating with an inlet valve chamber, an inlet valve therein adapted to seal said inlet valve passage way and having a shoulder thereon to partially seal an exit passage way from said chamber communicating with a chamber behind a high pressure valve operating mechanism, an exit passage way from said first mentioned chamber communicating with a former, whereby back pressure from the former is prevented from communicating with the second chamber until the former has been initially moved, a high pressure valve, a high pressure chamber communicating with a high pressure inlet passage way, a high pressure inlet passage way, said chamber communicating with the exit passage way to the former, means connected to said valve operating mechanism for unseating said high pressure valve member when the back pressure on said valve operating mechanism in the second mentioned chamber shall have reached a predetermined point, and a passage way communicating with the exterior of the valve casing, communicating with the area behind said valve operating mechanism to permit of the exit of air and liquids therein.

13. In combination, a valve casing, an inlet passage way communicating with an inlet valve chamber, an inlet valve therein adapted to seal said inlet valve passage way and having a shoulder thereon to partially seal an exit passage way from said chamber communicating with a chamber behind a high pressure valve operating mechanism, an exit passage way from said first mentioned chamber communicating with a former, whereby back pressure from the former is prevented from communicating with the second chamber until the former has been initially moved, a high pressure valve, a high pressure chamber communicating with a high pressure inlet passage way, a high pressure inlet passage way, said chamber communicating with the exit passage way to the former, means connected to said valve operating mechanism for unseating said high pressure valve member when the back pressure on said valve operating mechanism in the second mentioned chamber shall have reached a predetermined point, a passage way communicating with the exterior of the valve casing, communicating with the area behind said valve operating mechanism to permit of the exit of air and liquids therein, a valve member in the low pressure line, means to guide said valve member to seat therein a shoulder on said valve member whereby the high pressure fluid will seat said valve member to prevent the entrance of the high pressure fluid in the low pressure line.

In testimony whereof, I affix my signature.

RUSSELL A. TRACE.